May 15, 1951 — V. P. HEAD — 2,552,552
ROTAMETER
Filed Jan. 20, 1947

INVENTOR.
VICTOR P. HEAD
BY Leonard L. Kalish
Attorney

Patented May 15, 1951

2,552,552

UNITED STATES PATENT OFFICE 2,552,552

ROTAMETER

Victor P. Head, Lacey Park, Pa., assignor to Fischer & Porter Company, Hatboro, Pa., a corporation of Pennsylvania Application January 20, 1947, Serial No. 723,089

5 Claims. (Cl. 73—209)

1

The present invention relates to measurement of fluid rate-of-flow and it relates more particularly to a new and improved construction for rotameters or the like.

An object of the present invention is to provide for continuous measurement of fluid rate-of-flow. Another object of the present invention is to provide a new and improved rotameter construction for measuring rate-of-flow of fluids.

Other objects and advantages of the present invention are apparent in the following detailed description, appended claims and accompanying drawings.

It is now generally accepted and realized that a rotameter (namely an instrument wherein a metering float is disposed for free up-and-down movement within an elongated tapered vertical metering tube responsive to variations in the rate-of-flow of fluid through the tube) provides a sensitive and accurate means for measuring fluid flow-rate which is substantially superior to Venturi type instruments and the like.

Heretofore the only rotameters which have been employed commercially are those wherein the so-called "float" is actually a sink. That is, the float heretofore commercially employed has had a density somewhat greater than that of the fluid being metered so that, when there is no flow whatever, the float rests at the bottom or smaller end of the downwardly-tapered metering tube— the float being moved upward within the metering tube as the rate-of-flow of fluid passing upward through the tube increases.

It has been suggested in the past to employ a rotameter float which has a smaller density than that of the fluid being metered so that it would rest at the smaller or upper end of the upwardly-tapered metering tube when the tube is filled with a fluid at rest; the fluid being forced downward within the tube as the rate-of-flow of fluid passing downward through the tube increases.

However, this down-flow type of rotameter has never heretofore enjoyed any commercial success inasmuch as it has been impossible to perfect a practical float which has a density appreciably lower than that of the fluid being metered. Suggestions heretofore offered for creating a float having the necessarily low density have included the construction of a hollow float and the use of extremely light materials.

However, these light-weight floats heretofore suggested, have proven impractical because the difference in density, compared to the fluid being metered, was not sufficiently great to provide any appreciable capacity range for the rotameter.

2

That is, it is obvious, that if the difference in density between the float and the fluid is only slight, the float will move rapidly with changes in flow-rate, even with large-sized metering tubes.

According to the present invention, I have now found that it is possible to construct a commercially practical down-flow rotameter provided with a float having an apparent density substantially less than that of the fluid being metered, whereby a single instrument can measure flow-rate varying through a relatively large range.

Generally speaking, the present invention contemplates a down-flow rotameter wherein the vertical metering tube portion is provided with an extension chamber in vertical alignment and in communication therewith, said extension chamber being filled with a liquid appreciably denser than the fluid being metered and substantially immiscible therewith, and wherein the metering float is provided with an extension carrying a buoyancy member submerged within said heavier liquid so as to give the metering float an apparent density substantially less than the density of the fluid being metered.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1:
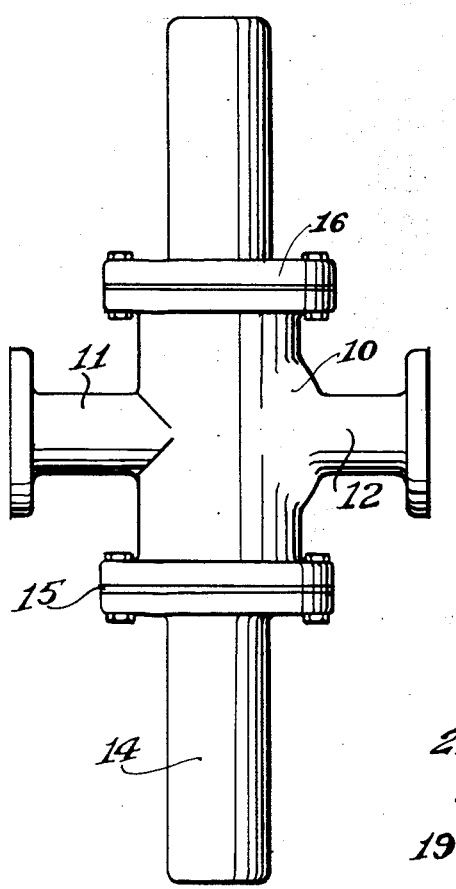
Fig. 1 represents an elevational view of one embodiment of the present invention.

In one embodiment of the present invention, I may provide a main body or housing section 10 having a flanged inlet opening 11 and a flanged outlet opening 12 adapted for connection to generally horizontal pipe lines (not shown).

Formed within the housing section 10 is a generally vertical upwardly-tapered metering tube or chamber 13. Fluid entering through the inlet 11 is adapted to flow downward through the metering chamber 13 and to leave through the outlet opening 12.

A liquid extension chamber 14 is bolted to the lower open end of the housing section 10, a centrally apertured gasket 15 providing a fluid-tight peripheral seal therebetween. The liquid extension chamber 14 is generally in vertical alignment with the metering chamber 13.

An upper extension compartment 16 is bolted to the upper open end of the housing section 10 and includes a sleeve 17, closed at its upper end and communicating with the metering chamber 13 at its lower end, on which are wound end-to-end coils 18 forming the transmitter coils of a conventional remote-indicating impedance system, such as is disclosed, for example, in the co-pending application of Nathaniel Brewer, Serial No. 511,649, filed November 25, 1943, now Patent No. 2,414,086 issued January 14, 1947.

Figure 2:
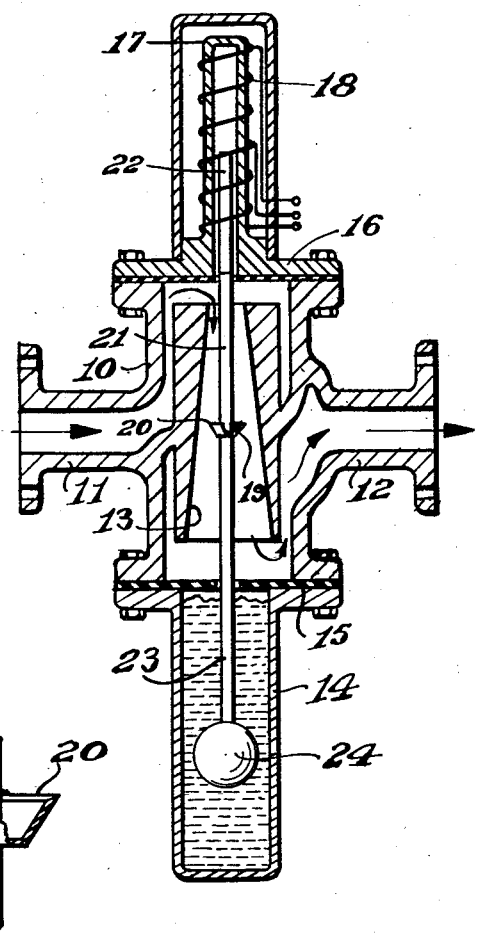
Fig. 2 represents a vertical cross-sectional view of the embodiment of Fig. 1.

The rotameter float includes an upwardly-opening umbrella-type flow-constricting head portion 19, the uppermost beveled peripheral edge 20 thereof providing a slight annular clearance with the upper smaller end of the metering chamber 13 and providing an increasingly greater annular clearance as the metering head 19 moves downward within the upwardly-tapered chamber 13 responsive to increase in rate-of-flow of fluid downward through said chamber 13. For clarity of illustration, the degree of taper of the metering chamber 13 has been exaggerated in Fig. 2. In actual practice, the degree of taper is considerably less than that shown in Fig. 2, in order to make the instrument more sensitive to variations in fluid flow-rate.

The metering float also includes a relatively thin elongated rod 21 extending upward from said head 13 and carrying an armature 22 at its upper end, the armature 22 extending within the sleeve 17 thereby to vary the impedance of the transmitter coils 18 responsive to variations in the height of the metering float, said variations in impedance being duplicated in appropriate receiver coils (not shown) so as to actuate receiver armatures which, in turn, actuate any appropriate remote indicating and/or recording and/or controlling and/or integrating mechanism as disclosed in co-pending Brewer application Serial No. 511,649 referred to above.

The metering float also includes an elongated rod 23 extending downward from the head 19, and through the aperture in the gasket 15 and into the liquid extension chamber 14. The lower end of the extension rod 13 carries a sealed ball or buoyancy member 24, which is filled with air or any other suitable gas, so that it is buoyant relative to the liquid filling the chamber 14.

It is obvious that the buoyancy of the ball 24 tends to raise the metering float, in opposition to the force of gravity.

It is, of course, possible readily to adjust the buoyancy of the ball 24 so that the apparent density of the metering float is less than that of the liquid or gas being metered, and so that the head portion 19 will remain at the upper smaller end of the metering chamber 13 when there is no downward flow of fluid therethrough and so that, as downward rate-of-flow increases, the head portion 19 will be forced downward to indicate the rate-of-flow and variations therein.

Thus, the buoyancy of the ball 24 can be regulated by varying the size of the ball or by filling it with hydrogen, or other extremely buoyant gas, or by using any one of various liquids, of different densities, within the chamber 14.

Where the fluid being metered is a gas or vapor, the liquid within the extension chamber 14 can be water or can be any other liquid which will not react chemically or otherwise interfere with the gas or vapor being metered. Where the fluid being metered is a liquid, such as water or gasoline or the like, the liquid within the extension chamber 14 can be mercury or other material which is substantially greater in density than the liquid being metered and which is relatively immiscible and will not react chemically or otherwise interfere with the liquid being metered.

Figures 3, 4:
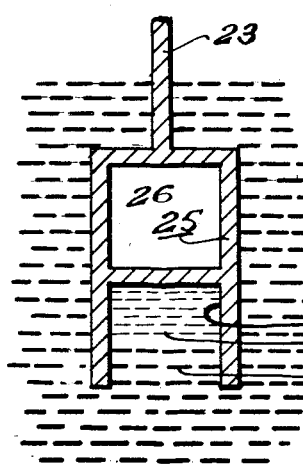
Fig. 3 represents a fragmentary cross-sectional view, on an enlarged scale, showing the metering float and extension chamber arrangement of a modified form of the present invention.
Fig. 4 represents a view generally similar to that of Fig. 3 but showing the appearance of the float extension illustrating the temperature-compensating feature of the buoying chamber.

In Figures 3 and 4 there is shown a modified form of the present invention in which the extension chamber 14 is filled with mercury, or other relatively dense liquid, for use in measuring the flow-rate of water or other similar liquid. The lower extension rod 23 of the metering float carries a somewhat different type of buoyancy member 25. The buoyancy member 25 includes an upper closed compartment 26 which is filled with air or other gas and also includes a lower compartment 27 which is open at its lower end. A layer of water 28 is provided within the upper portion of the lower compartment 27 and is held in place there by the denser layer of mercury 29 which fills the lower portion of the compartment 27.

The embodiment of Figures 3 and 4 is constructed to eliminate the errors in buoyancy effect which would otherwise result from changes in density in the mercury caused by variations in temperature of the fluid being metered. Thus, with a simple spherical member like the ball 24 of Figure 2, it is obvious that changes in temperature would cause variations in volume and density of the mercury, which, in turn, would vary the buoying effect of the buoyancy member and would thereby introduce errors into the rate-of-flow readings indicated by the metering float.

With the modified form of buoyancy member 25 shown in Figures 3 and 4, on the other hand, automatic compensation for density variations of the mercury with temperature changes is provided. Thus, the water 28 in the upper portion of the open compartment 27 would tend to expand much more rapidly with a given increase in temperature than would the mercury. This relatively greater expansion is indicated by Fig. 3 (wherein the water layer 28 occupies the greater part of the open chamber 27) as compared to the lower temperature position shown in Fig. 4 (wherein the water layer 28 occupies a relatively smaller proportion of the open chamber 27, the mercury level being relatively higher).

That is, with a given increase in temperature in the water being metered, the mercury would tend to expand and to become lighter in density, in which case the buoyancy provided by the closed compartment 26 of the member 25 would become less and the metering float would tend to sink. However, the rise in temperature would also tend to expand the water layer 28 (at a greater rate than the mercury) so as to cause a greater proportion of the lower open chamber 27 to be filled with the lighter water rather than with the heavier mercury. The replacement of some of the mercury with water in the lower chamber 27 would tend to lighten the buoyancy member 25 relative to the mercury.

Thus, the metering float would tend to rise so as to counteract the tendency to fall resulting from the decrease in density of the mercury upon the rise in temperature.

In this way, the buoyancy member 25 maintains the metering float at the proper relative density (with respect to the fluid being metered) regardless of variations in temperature.

The present invention contemplates further modifications of the structure shown in the drawings. Thus, for example, instead of including an impedance coil for remote indication, etc., upper member 16 could simply be provided with a sight-window to indicate the position of the top of the extension rod 21 and thereby to indicate the position of the metering float, in a manner similar to that shown in Brewer Patent No. 2,388,672.

Similarly, a transparent window could be provided in the housing section 10 to indicate directly the position of the flow-constricting head 19.

While the embodiment of Figures 3 and 4 has been described hereinabove as used in conjunction with the measurement of rate-of-flow of a liquid such as water, it is equally well adapted for use in measuring gases or vapors, such as steam or the like.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. For measuring the rate-of-flow of a fluid; a vertically-disposed metering chamber having upwardly-diminishing cross-sectional area available for fluid-flow, an extension chamber disposed below said metering chamber and in communication therewith, said extension chamber being filled with a liquid appreciably heavier than and substantially immiscible with the fluid being metered, a metering float including a flow-constricting head portion adapted for free up-and-down movement within said metering chamber responsive to variations in rate-of-flow of fluid downward through said metering chamber, an elongated rod extending downward from said head portion and into said extension chamber, and a buoyancy member mounted on the free end of said extension rod and submerged within the liquid, said buoyancy member including an upper sealed buoyancy chamber and a lower buoyancy chamber open at the bottom, said lower buoyancy chamber being partly filled, at its upper end, with a second liquid appreciably lighter than and substantially immiscible with the first-mentioned liquid, said second liquid changing in volume with variations in temperature, thereby to counteract density variations of the first-mentioned liquid resulting from said temperature variations, so as to maintain the buoyancy effect of said buoyancy member substantially constant regardless of said temperature variations.

2. For measuring the rate-of-flow of a fluid; a vertically-disposed metering chamber having upwardly-diminishing cross-sectional area available for fluid-flow, an extension chamber disposed below said metering chamber and in communication therewith, said extension chamber being filled with mercury, a metering float including a flow-constricting head portion adapted for free up-and-down movement within said metering chamber responsive to variations in rate-of-flow of fluid downward through said metering chamber, an elongated rod extending downward from said head portion and into said extension chamber, and a buoyancy member mounted on the free end of said extension rod and submerged within the mercury, said buoyancy member including an upper sealed buoyancy chamber and a lower buoyancy chamber open at the bottom, said lower buoyancy chamber being partly filled, at its upper end, with a fluid appreciably less dense than the mercury and substantially immiscible therewith, said last-mentioned fluid changing in volume with variations in temperature, thereby to counteract the density variations of the mercury resulting from said temperature variations, so as to maintain the buoyancy effect of said buoyancy member substantially constant regardless of said temperature variations.

3. For measuring the rate-of-flow of a fluid; a vertically-disposed metering chamber having upwardly-diminishing cross-sectional area available for fluid-flow, an extension chamber disposed below said metering chamber and in communication therewith, said extension chamber being filled with mercury, a metering float including a flow-constricting head portion adapted for free up-and-down movement within said metering chamber responsive to variations in rate-of-flow of fluid downward through said metering chamber, an elongated rod extending downward from said head portion and into said extension chamber, and a buoyancy member mounted on the free end of said extension rod and submerged within the mercury, said buoyancy member being constructed and arranged to reduce the apparent density of the metering float to a value substantially less than the density of the fluid being metered, said buoyancy member including an upper sealed buoyancy chamber and a lower buoyancy chamber open at the bottom, said lower buoyancy chamber being partly filled, at its upper end, with water, said water changing in volume with variations in temperature, thereby to counteract density variations of the mercury resulting from said temperature variations, so as to maintain the buoyancy effect of said buoyancy member substantially constant regardless of said temperature variations.

4. For measuring the rate-of-flow of a fluid; a vertically-disposed tapered metering chamber, an extension chamber disposed in vertical alignment with said metering chamber and communicating therewith, said extension chamber containing a body of liquid appreciably heavier than and substantially immiscible with the liquid being metered, a metering float including a flow-constricting head portion adapted for free up-and-down movement within said metering chamber responsive to variations in rate-of-flow of fluid through said metering chamber and including a buoyancy member disposed within said extension chamber and fully immersed within said liquid and including rigid connecting means intermediate said head portion and said buoyancy member, said metering float having an apparent density relative to the fluid being metered such that the head portion is maintained at the smaller inlet end of the tapered metering tube when there is no flow of fluid and is moved toward the larger outlet end of the metering tube upon increase in rate-of-flow without any appreciable variation in apparent density of said metering float, said buoyancy member including an upper sealed buoyancy chamber and a lower buoyancy chamber open at the bottom, said lower buoyancy chamber being partly filled at its upper end with a second liquid appreciably lighter than and substantially immiscible with the first-mentioned liquid, said second liquid changing in volume with variations in temperature thereby to counteract density variations of the first-mentioned liquid resulting from said temperature variations so as to maintain the buoyancy effect of said buoyancy member substantially constant regardless of said temperature variations.

5. For measuring the rate-of-flow of a fluid; a vertically-disposed tapered metering chamber, an extension chamber disposed below said metering chamber and communicating therewith, said extension chamber containing a body of mercury, a metering float including a flow-constricting head portion adapted for free up-and-down movement within said metering chamber responsive to variations in rate-of-flow of fluid through said metering chamber and including a buoyancy member disposed within said extension chamber and fully immersed within said body of mercury and including rigid connecting means intermediate said head portion and said buoyancy member, said metering float having an apparent density relative to the float being metered such that the head portion is maintained at the smaller inlet end of the tapered metering tube when there is no flow of fluid and is moved toward the larger outlet end of the metering tube upon increase in rate-of-flow without any appreciable variation in apparent density of said metering float, said buoyancy member including an upper sealed buoyancy chamber and a lower buoyancy chamber open at the bottom, said lower buoyancy chamber being partly filled at its upper end with a liquid appreciably lighter than and substantially immiscible with the mercury, said liquid changing in volume with variations in temperature thereby to counteract density variations of the mercury resulting from said temperature variations so as to maintain the buoyancy effect of said buoyancy member substantially constant regardless of said temperature variations.

VICTOR P. HEAD.

REFERENCES CITED

The following references are of record in the file of this patent:

UNITED STATES PATENTS

| Number | Name | Date |
| --- | --- | --- |
| 784,948 | Kuhnke | Mar. 14, 1905 |
| 2,411,330 | Melas et al. | Nov. 19, 1946 |

FOREIGN PATENTS

| Number | Country | Date |
| --- | --- | --- |
| 937 | Great Britain | 1873 |
| 771,666 | France | July 30, 1934 |
| 304,890 | Germany | Apr. 15, 1918 |
| 378,726 | Germany | July 30, 1923 |